United States Patent [19]

Hanke et al.

[11] 3,791,902

[45] Feb. 12, 1974

[54] METHOD FOR COATING TAMPONS WITH WATER-SOLUBLE FILM

[75] Inventors: David E. Hanke, Neenah; Richard R. Tews, Menasha, both of Wis.

[73] Assignee: Kimberly-Clark Corporation, Neenah, Wis.

[22] Filed: Nov. 12, 1971

[21] Appl. No.: 198,278

[52] U.S. Cl................. 156/212, 156/307, 156/245, 128/270
[51] Int. Cl. ...... B29c 17/02, C09j 5/02, A61f 13/20
[58] Field of Search... 156/307, 163, 212, 213, 245, 156/215; 128/285, 270

[56] References Cited
UNITED STATES PATENTS
2,831,527   4/1958   Myers et al..................... 156/163 X
2,867,560   1/1959   Strawinski...................... 156/307 X Primary Examiner—Daniel J. Fritsch
Assistant Examiner—M. G. Wityshyn
Attorney, Agent, or Firm—Daniel J. Hanlon

[57] ABSTRACT

A method for coating the tip of a compressed absorbent tampon with a thin film of water-soluble plastic. The uncoated surface of the prefabricated film, such as polyvinyl alcohol, which is to be applied to the tampon is solvent-activated by humidifying the film or by the application thereto of a plasticizing fluid. While the film surface is still activated the film is molded onto the tampon tip by means of a heated tip-conforming die. The result is a thin film of unstressed polyvinyl alcohol intimately bonded to the tampon tip over the entire film-tampon interface by the autogenous adhesive power of the plasticized film.

7 Claims, 3 Drawing Figures

PATENTED FEB 12 1974 3,791,902

METHOD FOR COATING TAMPONS WITH WATER-SOLUBLE FILM

BACKGROUND OF THE INVENTION

In the prior art and notably U.S. Pat. Nos. 2,808,832 and 2,831,527 to Myers et al, it is taught that water-soluble polyvinyl alcohol and particularly adhesive-coated prefabricated films thereof are useful in providing the leading end of a tampon with a lubricant film which aids insertion while being dispersible in body fluids.

In the Myers et al patents the rounded tip of a compressed tampon is pressed against an unheated polyvinyl alcohol film having its edges anchored to prevent horizontal movement. As the tampon tip is pressed against the film, the unheated film is stretched tightly therearound. The stretched and taut film is then circumferentially cut by a serrated knife and the cut edges are sealed around the periphery of the tip by heat and pressure. Under ideal conditions this provides a tampon having its rounded end tightly encased in a prefabricated taut film. However, it has been found that as the film-tipped tampon ages, the stretched film tries to return to its unstretched condition. This causes the cut edges to pull loose from their circumferential bond in many cases and as a result instead of tightly encasing the rounded entrant end of the tampon as intended the film retracts into the shape of a loosely attached, somewhat dimpled cap over the end and often has unattached edges of the film visibly protruding.

It is also noted that the patent cautions against using a film which is too thin or which has been moistened by an aqueous adhesive to the extent that the film is dissolved, weakened or distorted. It has now been discovered that certain of these alleged disadvantages may be utilized to provide an improved product which has an unstressed polyvinyl alcohol film intimately bonded to a tampon over the entire film-tampon interface.

SUMMARY OF THE INVENTION

In carrying out a preferred embodiment of this invention a prefabricated film of polyvinyl alcohol is placed on the face of a heated die block having a polished cavity approximating the shape and size of a rounded tampon tip drilled therein. A holding block having a slightly larger matching aperture is placed over the film, holding the film against horizontal movement. At least the upper surface of the film is solvent-activated by earlier humidification or by the application thereto of a thin coating of a plasticizing fluid or vapor. The block is heated to a temperature of about 410°F. or sufficient to heat the film to a temperature in the range of 300°F to 410°F to cause the film to soften and billow upward as the gas below it begins to expand. While the surface of the film is still activated, or wetted by the plasticizing fluid, the rounded end of a compressed, self-sustaining tampon is then quickly pushed against the solvent-activated and heat-softened film and into the polished cavity. The heated cavity presses the film into firm uniform contact with the entire surface area of the tampon tip whereby the solvent-activated inner surface of the film is caused to adhere intimately to the rounded end of the tampon over the entire film-tampon interface. The heat from the die block is sufficient to cause the edges of the film in contact with the circumference of the cavity to soften and to be severed at the edges of the holding plate. The film-covered tip is then withdrawn from the cavity. The withdrawn tampon has a very smooth, tightly-adhered covering of water-soluble film on the rounded tampon end. Due to the heat softening of the film prior to and during the molding operation it remains very plastic with substantially all internal stress removed, so that it is readily conformed around the tampon tip by the heated mold. The plasticized, solvent-activated surface acts as an autogenous adhesive resulting in a tight adherence of the film to the tampon tip over the entire area of contact. The cooled film is in a substantially unstressed condition due to the heat-softening action during the molding operation. The adherent bond between film and tampon obtained by heating and pressing the solvent-activated film against the tampon has been found to be so strong over the entire film-tampon interface that it is impossible to remove any portion of the film without destroying the film, or without causing part of the fibrous tampon surface to peel away with the film when attempts are made to remove the film. This tight adherence and the substantially unstressed condition of the film removes any tendency the film might otherwise have to shrink or to become distorted upon aging.

DETAILED DESCRIPTION

Figure 1:
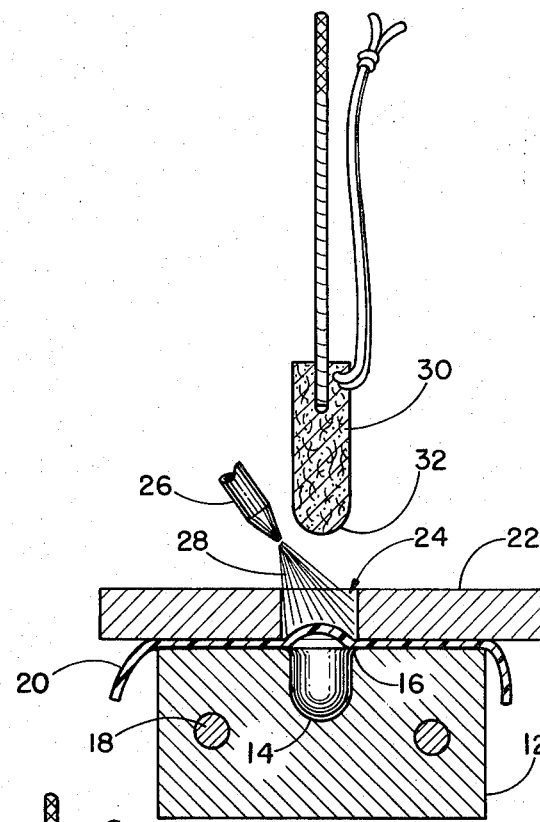
FIG. 1 is a sectional view of a device suitable for carrying out the method of the invention and showing the relative disposition of the film and tampon with respect to the device.
Figure 2:
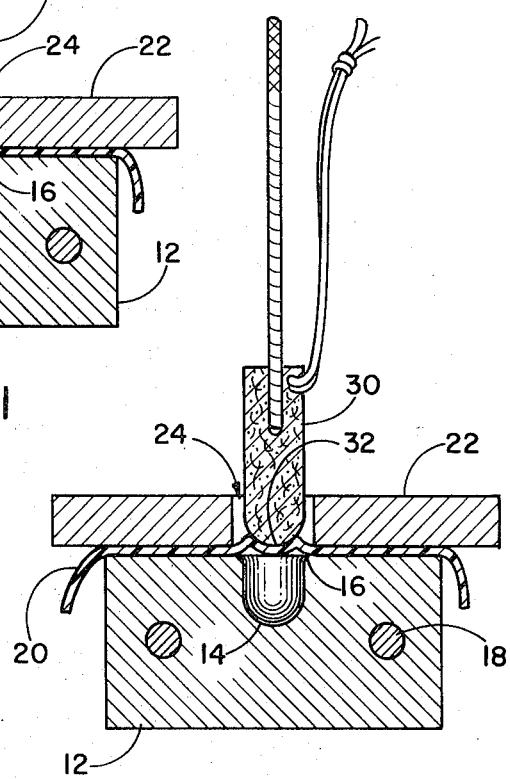
FIG. 2 is a sectional view similar to FIG. 1 in which the tampon has been moved into contact with the film.
Figure 3:
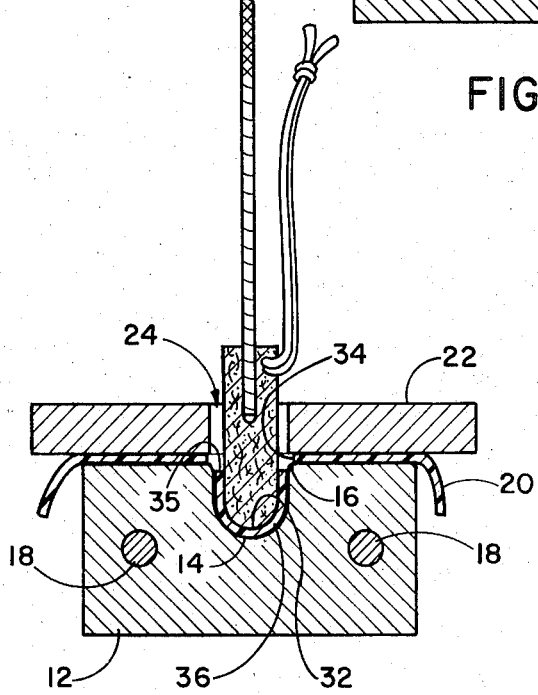
FIG. 3 is a sectional view similar to FIG. 1 in which the tampon has been pressed completely into the die with the film formed around the tampon tip and firmly adhered thereto.

In the drawings there is shown a device suitable for carrying out the method of this invention. The device is comprised of a die block 12 the upper surface of which has a polished hemispherical cavity 14 drilled therein by a ball end mill. The edge 16 of the cavity 14 is rounded off and polished to assure a smooth flow of the film surface which contacts it. Die block 12 is also provided with two cartridge heaters 18 for heating the die block to a predetermined high temperature. The device is also provided with a holding plate 22 having a circular aperture 24 which is disposed concentrically over cavity 14 and in tight contact with film 20 while carrying out the method. A nozzle 26 may also be provided and disposed above aperture 24 for the purpose of spraying a plasticizing fluid or vapor 28 into aperture 24 onto the exposed surface of film 20. A precompressed tampon 30 with a rounded leading end 32 is also shown in position for the operation. Tampon 30, shown with a conventional insertion stick and withdrawal string, is disposed directly above aperture 24 and cavity 14. The dimension and shape of cavity 14 is of substantially the same dimension and shape as leading end 32 of the tampon, with cavity 14 being slightly larger than rounded end 32 to accommodate the desired thickness of film.

In one method for carrying out the coating of tampons with water-soluble film as defined herein, a sheet of water-sensitive thermoplastic film 20 is first placed on the top surface of die block 12 spanning cavity 14.

Plate 22 is then placed over film 20 to hold the film firmly in place on the die block. Block 12 is either preheated to about 410°F or quickly brought to that temperature while nozzle 26 sprays a small amount of fluid solvent or vapor onto the surface film 20 exposed by aperture 24. The fluid solvent utilized may be water, glycerine, propylene glycol, sorbitol, 1, 2-propanediol, or a mixture of water with any of the latter. The heat generated by block 12 softens the wetted film, and the heated gas in the cavity behind it causes the film to billow up into aperture 24 as shown.

While the film surface is still activated or moist with fluid, tampon 30 is pressed through aperture 24 contacting heat-softened film 20 and pressing that portion of the film and the leading end 32 of the tampon into hemispheric cavity 14. As the heat-softened film is pushed into cavity 14 circumferential portions of the film contact the rounded edges 16 of the cavity and the film in that area is melted sufficiently so that it is circumferentially severed at 34 and 35 and the portion in contact with the tampon forms a smooth cap 36 on the tampon end.

The solvent-activated surface of the film and the tampon end 32 are thereby firmly bonded to each other over the entire film-tampon interface.

The critical steps in the method are the solvent-activation treatment of the film with a plasticizing fluid or vapor, combined with the heat-softening of the thus plasticized film and the molding of the heat-softened film around the tampon end while the film is still solvent-activated by the fluid. Solvent-activation may be accomplished by spraying or otherwise wetting the surface as described above, or by humidifying the film before application, i.e., subjecting the film to sufficient humidity so that the film picks up moisture from the moisture-enriched atmosphere. Satisfactory humidification may be obtained for example, by subjecting the film to a relative humidity of about 80 percent at 72°F for a period of about 2 hours.

Before successfully arriving at the film treating procedure outlined above, attempts were made to merely heat the dry film to soften it and then mold the softened film onto the tampon tip without first solvent-activating the surface. When this was tried it was found that the film tended to split apart, and failed to attach itself firmly and smoothly to the tampon. No satisfactory product could be obtained. However, when the film is subjected to high humidity conditions before processing with heat, the hydrophilic nature of the sheet apparently causes at least the surface of the film to pick up water and become surface-activated whereby the described adhering effect is obtained if application is made while the film is still moist.

On the other hand when the film is treated with each of the plasticizing fluids named above and then dried before applying heat and pressure, results are similar to that for untreated film, i.e., no satisfactory molding or bonding is achieved.

Also, when a starch adhesive in water was applied to the film and dried before attempting to apply the film with heat and pressure as described, results were also unsuccessful, being similar to the results obtained with untreated film.

The heat-softening combined with solvent-activation apparently removes all major stresses from the film and, contrary to the prior art teachings, apparently is the reason why the film can be molded around the tampon tip when heated to thereby provide the tip with a substantially uniform coating of continuous highly polished and unstressed film. In addition, a very firm bond is established throughout the film-tampon interface.

The polyvinyl alcohol film should, of course, be cold-water soluble so that it readily dissolves in menstrual fluids. The film employed in the experiments described herein was made from polyvinyl alcohol which was about 79–82 percent hydrolyzed, had a viscosity of about 22 cps (4% solution at 20°C), and was readily soluble in cold water. In general, polyvinyl alcohols having a percent hydrolysis in the range of 74 to 98 are cold-water soluble and suitable for the described use.

The thickness of the film employed was from about 1 to 2 mil (0.001 inch to 0.002 inch) which thinned down to about one-fourth to one-half mil after application. When used as an insertion aid it is preferred that a very thin film be used to permit rapid solution by vaginal fluids after insertion. The film also should be of a thickness which is readily severed by the edges of the heated die cavity as described. It should be noted that none of the plasticizers used for solvent-activation of the film are adhesives. No supplementary adhesives are required or desired. The adhesive bonding of the film to the tampon is autogenous, and depends entirely on the adhesive power of the plasticized film surface itself.

What is claimed is:

1. A method for applying a water-soluble polyvinyl alcohol film to the rounded tip of a compressed absorbent tampon which comprises solvent-activating at least the one surface of said film which is to be applied to the tampon tip by causing said surface to be wetted with a suitable solvent, heating said solvent-activated film while still wetted with said solvent to a temperature in the range of 300°F to 410°F to cause said film to soften and become flaccid, applying the rounded tip of said tampon against the wetted solvent-activated surface of said heated and softened film, pressing said film into intimate contact over the entire surface of said rounded tip by applying uniform pressure thereover while maintaining the entire applied area of said film in said softened condition by continued application of said heat, and thereafter removing said pressure and heat.

2. The method of claim 1 wherein said solvent-activation is accomplished by humidifying said film in a moisture-enriched atmosphere.

3. The method of claim 2 wherein said solvent-activation is accomplished by subjecting said film to a relative humidity of 80 percent at a temperature of about 72°F for about 2 hours.

4. The method of claim 1 wherein said solvent-activation is accomplished by applying to said one surface a thin coating of a fluid solvent therefor.

5. The method of claim 2 wherein one surface of said humidified film is coated with a fluid solvent therefor.

6. The method of claim 4 wherein said fluid solvent is selected from the group consisting of water; glycerine; propylene glycol; sorbitol; 1, 2-propanediol; and compatible mixtures thereof.

7. The method of claim 5 wherein said fluid solvent is selected from the group consisting of water; glycerine; propylene glycol; sorbitol; 1, 2-propanediol; and compatible mixtures thereof.

* * * * *